United States Patent [19]

Someya

[11] Patent Number: 5,552,900
[45] Date of Patent: Sep. 3, 1996

[54] IMAGE FORMING APPARATUS HAVING MEANS TO REGISTER MARKER PENS USED FOR IMAGE EDITING

[75] Inventor: Akihiko Someya, Kawasaki, Japan

[73] Assignee: Kabushiki Kaisha Toshiba, Kawasaki, Japan

[21] Appl. No.: 208,222

[22] Filed: Mar. 10, 1994

[30] Foreign Application Priority Data

Mar. 29, 1993 [JP] Japan .................................. 5-069784

[51] Int. Cl.$^6$ ............................................... H04N 1/387
[52] U.S. Cl. ............................................ 358/452; 358/453
[58] Field of Search ................................. 358/452, 453, 358/406, 537, 538, 504, 451

[56] References Cited

U.S. PATENT DOCUMENTS 4,538,182  8/1985  Saito et al. ............................ 358/538
5,028,991  7/1991  Sekizawa et al. ..................... 358/537

FOREIGN PATENT DOCUMENTS 3-7179  1/1991  Japan .

*Primary Examiner*—Scott A. Rogers
*Attorney, Agent, or Firm*—Foley & Lardner

[57] ABSTRACT

In an image forming apparatus, a color processing circuit calculates a ratio of color components of an image signal supplied from a CCD sensor. In a marker pen registering mode, its color components are detected by a marker color detecting section and stored in memory of a marker registering/canceling section. When the color of the marker pen is canceled, its color components are deleted from memory of the marker registering/canceling section. Since it is possible to cancel/register the marker pen, any general-purpose marker pen, in addition to a marker pen used exclusively for the apparatus, can be used upon editing. Thus, image editing can be implemented without using any designating means specific only to the apparatus.

4 Claims, 7 Drawing Sheets

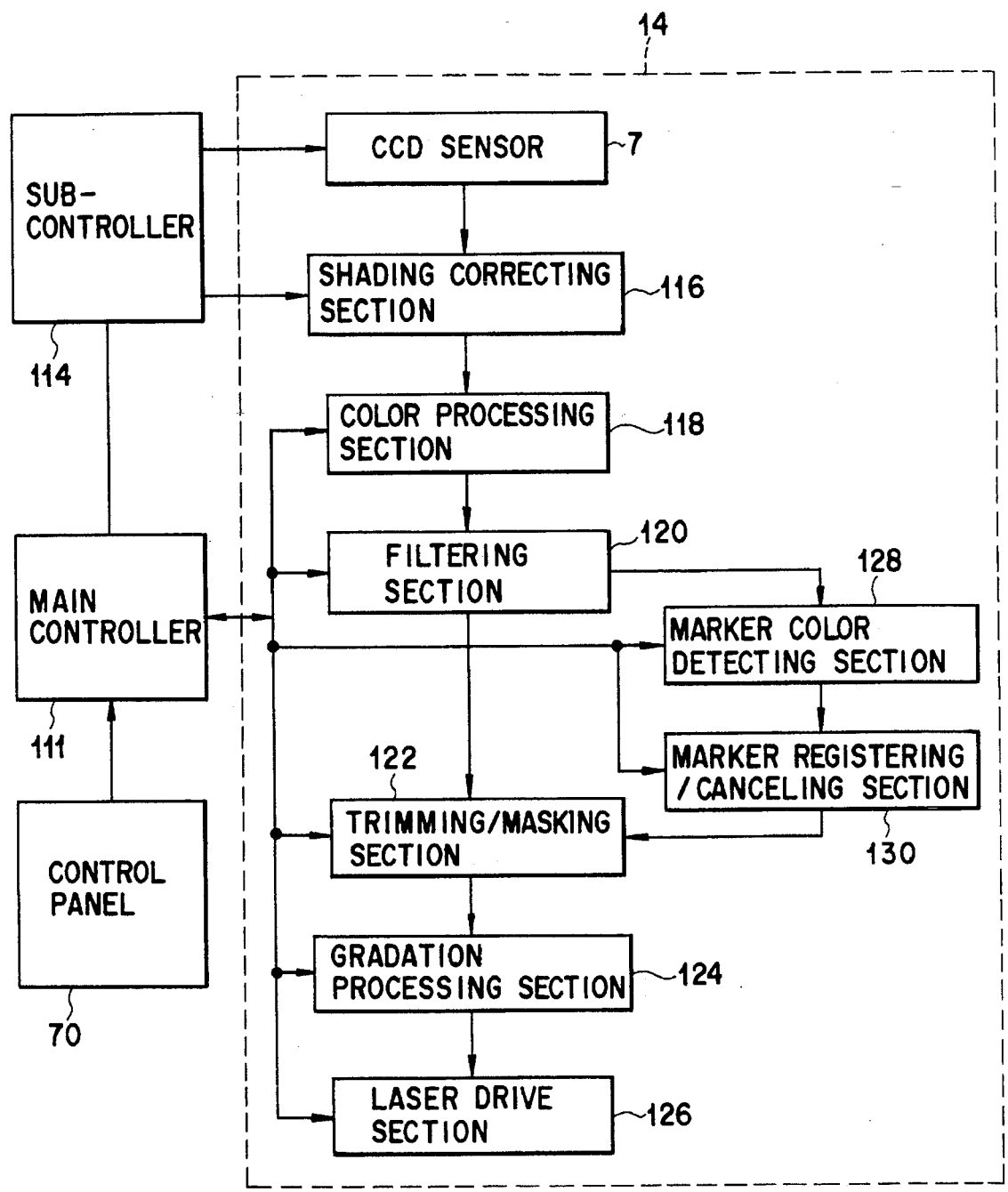
F I G. 4

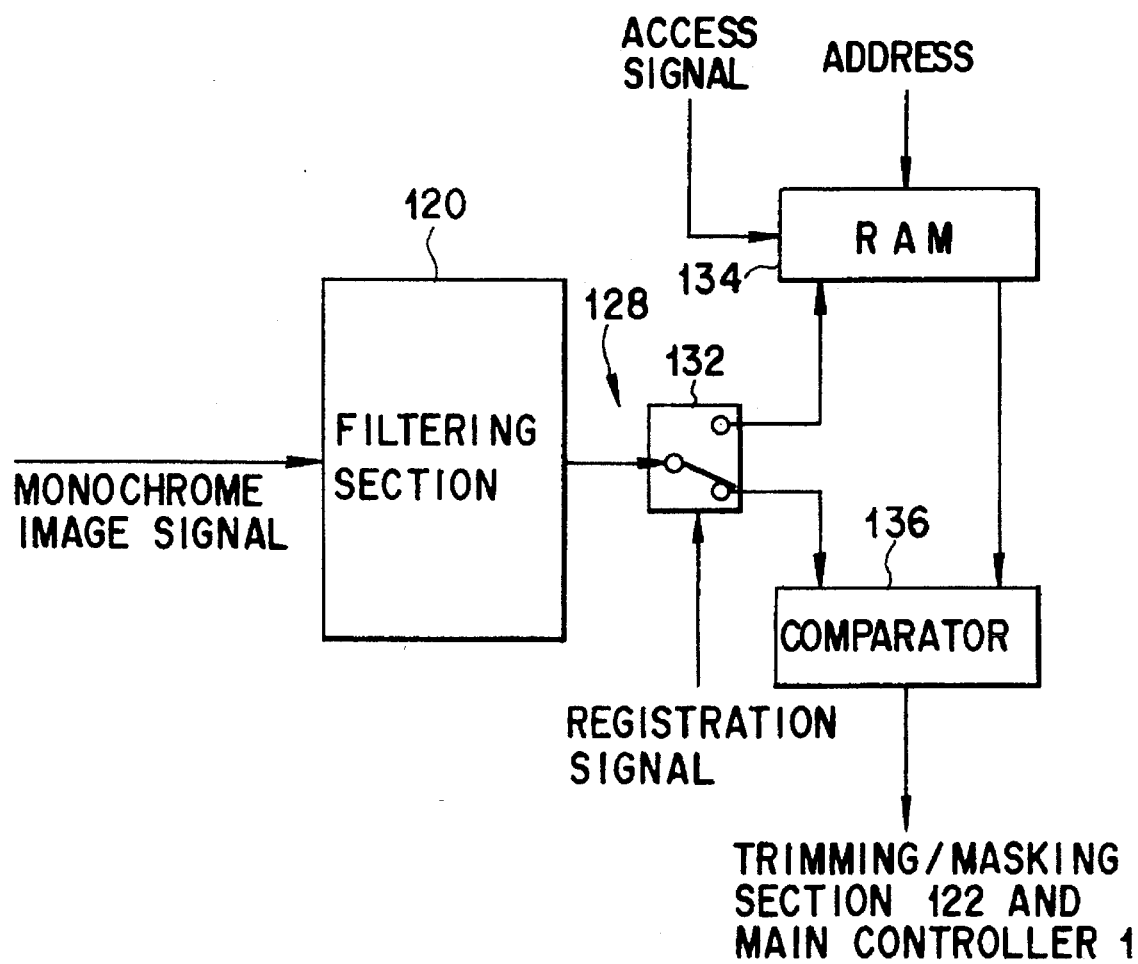
F I G. 8

IMAGE FORMING APPARATUS HAVING MEANS TO REGISTER MARKER PENS USED FOR IMAGE EDITING

BACKGROUND OF THE INVENTION

1. Field of the Invention

The present invention relates to an image forming apparatus having an image editing function and, in particular, an image editing function-equipped image forming apparatus which, in a digital copying machine for reading an image in dot units and copying it on a sheet, can edit an image by designating an editing range for, for example, trimming, masking or centering.

2. Description of the Related Art

Known as a conventional image forming apparatus is a digital copying apparatus equipped with an image editing function for, for example, trimming, masking or centering. In the copying apparatus of this type, editing is normally performed on a document through the designation of that editing range and a corresponding image is processed based on the designated range. An apparatus has already been proposed in which a marker pen is used as a means for designating such an editing, etc.

In such proposed image forming apparatus, an editing range cannot be designated on a document unless a given marker pen, or color, specific to the apparatus is employed. In the case where the editing range is designated by other than the specific marker pen or color, there is a problem that the apparatus neither recognizes the editing range nor generates an edited image. Consequently, the user of the apparatus has to carry a specific spare marker pen with him or her or interrupt an editing operation until the specific marker pen is available. Therefore, the apparatus is not user-friendly and there is room for improvement.

There is a growing demand for an editing function-equipped image forming apparatus of such a type that, even if the editing range is not specified by a specific marker pen, it is still possible to register a general-purpose marker pen as a marker pen for editing on the image forming apparatus and to perform an editing operation with the use of such a registered marker pen.

SUMMARY OF THE INVENTION

It is accordingly the object of the present invention to provide an editing function-equipped image forming apparatus which can edit an image without the need to use an edit designating means specific to the apparatus.

Further, the object of the present invention is to provide an image forming apparatus which can register the characteristics of a designating means for designating an editing range on a document and edit an image by the registered designating means.

According to one aspect of the present invention, there is provided an image processing apparatus, comprising means for reading a document to output an image signal, the document including an image read by the reading means and an editing mark drawn by a marker pen so as to designate an editing area in the image on the document; means for storing a sign of the marker pen; means for detecting the editing mark by referring to the sign of the marker pen stored in the storing means; means for discriminating, in accordance with a result of detection by the detecting means, a designated image signal corresponding to the designated editting area in the image from the image signal which is output from the reading means; and means for deleting the sign of the marker pen stored in the storing means and for storing a sign of a new marker pen in the storing means.

Further, according to another aspect of the present invention, there is provided an image forming apparatus comprising: means for defining an editing range on a document and for setting an edit mode; means for setting a registration mode for registering a sign of a marker pen for designating the editing range on the document; means for converting the sign of the marker pen which is read in the registration mode to a marker pen signal and for converting an image which is read from the document in the edit mode to an image signal; means for storing the marker pen signal in the registration mode and for registering the marker pen signal; means for comparing the marker pen signal to the image signal and for editing the image signal; means for deleting the marker pen signal stored in the storing means and for storing a new marker pen signal in the storing means; and image forming means for forming an image on a basis of the image signal edited by the editing means.

In the image forming apparatus, since it is possible to change the marker pen information of a marker pen for designating an editing area, an editing operation can be performed by taking an editing procedure with the use of any general-purpose marker pen and without the need to use any specific marker pen only.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a block diagram showing an image processing circuit for the image forming apparatus according to one embodiment of the present invention;

FIG. 8 is a block diagram showing, in more detail, a marker image density detecting section and marker registering/canceling section in FIG. 7.

DETAILED DESCRIPTION OF THE PREFERRED EMBODIMENTS

An image reading apparatus and image forming apparatus according to one embodiment of the present invention will be explained below with reference to the accompanying drawings.

Figure 1:
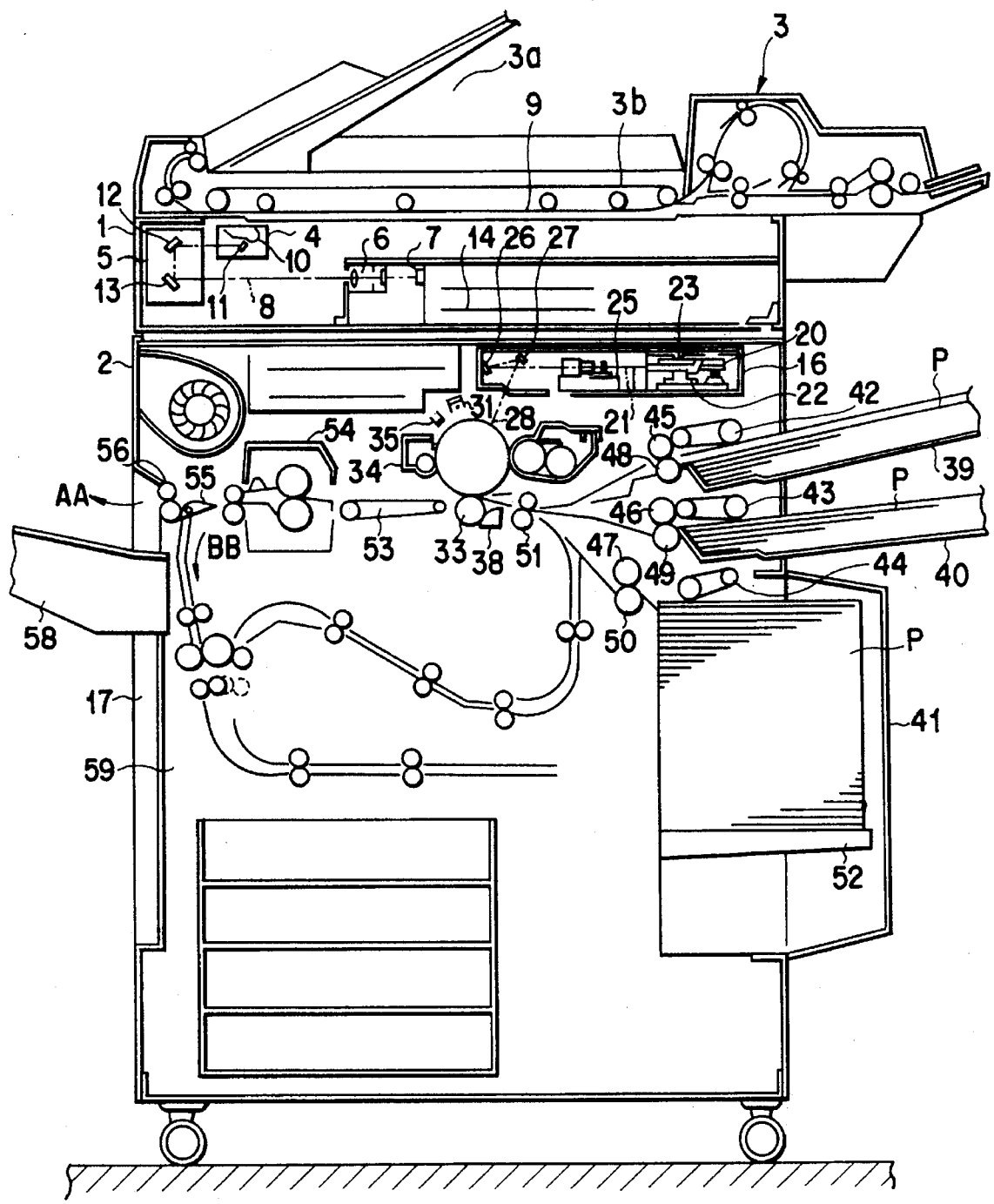
FIG. 1 is a cross-sectional view diagrammatically showing an inner arrangement of an image forming apparatus according to one embodiment of the present invention.

FIG. 1 is a diagrammatic view showing an inner arrangement of a copying apparatus as one form of an image forming apparatus according to the present invention. The copying apparatus comprises a scanner 1 serving as a document reading unit for optically reading image information, such as document information, and converting it to an electrical signal with a time sequence and a printing unit 2 serving as an image output unit for printing out corresponding image data.

The scanner 1 comprises a return auto document feeder (RADF) 3 for automatically feeding a document after it has been inverted and an exposure unit 8 comprising a first carriage 4, second carriage 5, image forming lens 6 and CCD line sensor 7.

In FIG. 1, the document is placed on document glass 9 with its image side down. The document is placed with a front left side as a reference as viewed from a shorter direction of the document glass 9. The document is pressed down on the document glass 9 by a conveying belt 3b in a feed unit section 3a of RADF 3. The document is illuminated with a fluorescent lamp 10 and its reflected light is passed through mirrors 11, 12 and 13 and image forming lens 6 to that face of the CCD sensor 7 where it is focused. The CCD sensor 7 has a plurality of photosensitive elements in an array.

The first carriage 4 has the mirror 11 and the second carriage 5 has the mirrors 12 and 13. The first and second carriages 4 and 5 are moved in a relative speed of 2:1, that is, moved by a pulse motor (not shown) from left to right along a vertical direction. The vertical scanning speed is such that, under a reading magnification, a two-phase pulse motor excitation method is adopted using a ½ phase excitation mode and switching is made in a microstep drive. In a low speed range in particular, a circuit for a pulse motor driver (not shown) is so designed that a current wave-form for canceling an oscillation inherent in a drive system may be input to a pulse motor.

By so doing, the image of the document on the document glass 9 is sequentially read out, by the CCD sensor 7, in a unit of dots per line. An image signal emerging from the CCD sensor 7 is processed by a later-described image processing unit 14 and then outputted to the printing unit 2.

The printing unit 2 comprises an image forming unit 17 combining, with the laser optical system 16, an electrophotographic system capable of forming images on both sides of a transfer sheet. That is, the image data which is sent from the image processing unit 14 is processed with an image data processing circuit (not shown) and input to a semiconductor laser oscillator 20. As a result, the semiconductor laser oscillator 20 is driven in accordance with the image data and delivers a modulated laser beam 21 as an output. The output laser beam 21 is shaped by a beam shaping optical system (not shown), such as a cylindrical lens, and deflected by a rotating polygonal mirror 23 which is rotatively driven by a high-speed rotation motor 22 utilizing an air bearing. The deflected laser beam 21 passes through an fθ lens 25 and reflected by mirrors 26 and 27. The reflected laser beam is passed through protective glass 28 and focused on a photosensitive drum 29. Thus an optical beam spot of adequate resolution is formed on the surface of the photosensitive drum. The rotating photosensitive drum 29 is scanned and exposed with the light beam spot to form a latent image on the photosensitive body 29. The laser beam deflected by the rotating polygonal mirror 23 is synchronized with an image signal by detecting the laser beam with a beam detector (not shown) comprised of a photodiode.

Around the outer periphery of the photosensitive drum are arranged a charger 31 for charging the surface of the photosensitive body, developer 32 for developing, with a developing agent, an electrostatic latent image on the photosensitive drum 29, transfer roller 33 for transferring the developed image, cleaner 34 for cleaning an area on the photosensitive drum 29 after transferring has been completed, and a discharging lamp 35 for discharging the area on the photosensitive drum 29 after the completion of transferring.

The photosensitive drum 29 is rotatively driven, by a drive motor, not shown, at a peripheral speed of V0 and has its surface charged by the charger 31 located at an opposing relation to the surface of the photosensitive drum 29 and having a grid electrode. The charged photosensitive drum 29 is scanned with the laser beam 21 to form a latent image thereon. The photosensitive drum 29 bearing the latent image thereon is rotated at the speed V0 to the developing position where the latent image on the body is developed with a toner supplied from the developer 32 and a toner image is formed. The toner-image bearing drum 29 continues its rotation at the speed V0, reaching the transfer position where the image is transferred by the transfer roller 33 on a transfer sheet P which is fed by a proper timing from a paper supply system. Any excessive toner deposited on the transfer roller 33 is cleaned with a transfer roller cleaner 38.

The paper supply system has a sheet feeding mechanism for allowing the transfer sheet P which constitutes an image formation medium to be selectively fed from three places, that is, two cassettes 39 and 40 and large-capacity feeder 41. The paper supply system includes, in addition to the sheet feeding mechanism, an inverting sheet refeeding mechanism 59 which, after the image-bearing sheet P has been inverted, can refeed the inverted sheet so that an image can be formed on the inverted sheet.

Any one of the transfer sheets P of the cassettes 39 and 40 and large capacity feeder 41 is selectively fed, for example, through the starting of a feeding operation by corresponding one of pickup roller 42, 43 and 44, the supplying operation of the sheet by a corresponding one of supply rollers 45, 46 and 47, and the separating operation of the sheet by a corresponding one of separation rollers 48, 49 and 50, to a resist roller 51. Then the sheet is fed to the transfer section in a predetermined timing. An elevator 52 in the large-capacity feeder 41 is movable in up/down direction in accordance with the number of sheets to be copied so that a corresponding sheet level is reached.

Downstream of the transfer roller are provided a paper conveying mechanism 53 for conveying the sheet, fixing unit 54 for fixing a developing agent on the sheet, path switching guide 55 for switching an image bearing sheet toward an outside or toward the inverting sheet refeeding section 59, and discharge rollers 56 for discharging a developed sheet. The path switching guide 55 can allow the path of the sheet which is sent from the fixing unit 54 to be switched toward a direction AA or direction BB in FIG. 1. For example, when the path switching guide 55 is in a state shown in FIG. 1, the sheet P is moved on the path AA and discharged into a discharge tray 58 after being passed through the discharge rollers 56.

Figure 2:
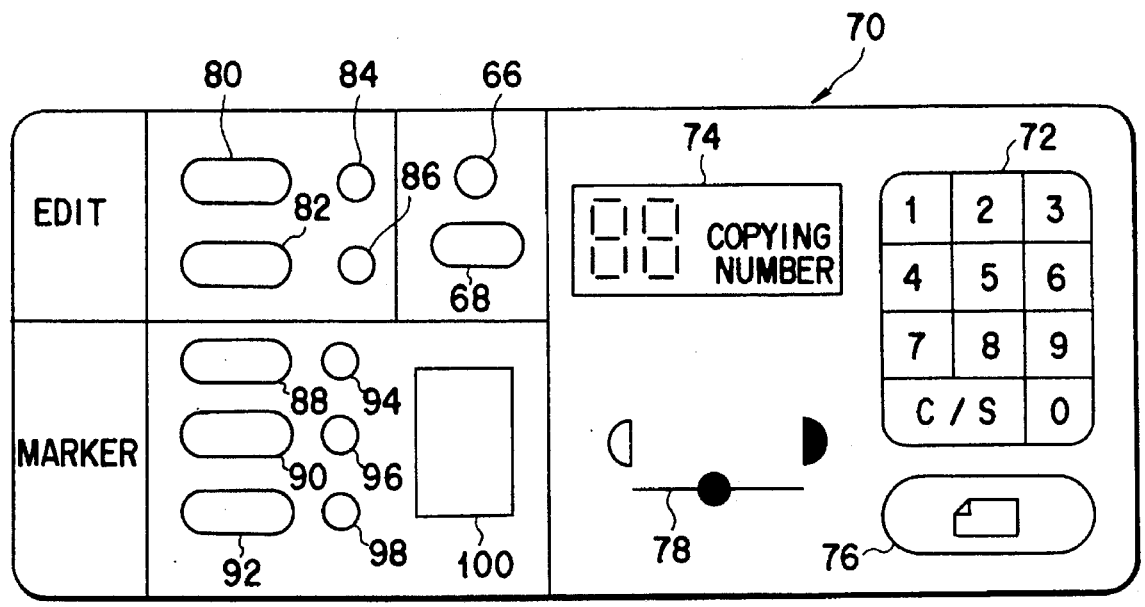
FIG. 2 is a plan view showing a control panel of the image forming apparatus as shown in FIG. 1.

AS shown in FIG. 2, a control panel 70 is provided at the front side of the copying apparatus. Copying sheet number setting keys 72 are provided on the control panel 70 to set the number of sheets to be copied and the copying sheet number thus set is displayed on a display section 74. A start key 76 is provided below the number setting key 72 (plan view) to instruct a start of copying and a density adjusting key 78 is provided below the display section 74 (plan view) to set an image density on the sheet. An "edit" section includes a marker pen editing key 68 for designating editing processing with the use of a marker pen, masking key 80 for designating the masking associated with a marker pen edit mode, and a trimming key 82 for designating the trimming. LEDs 66, 84, and 86 are provided near the editing key 68, masking key 80 and trimming key 82, respectively, so as to indicate that a corresponding editing operation is now going on. A "marker" section includes a marker pen registering key 88 available to register the marker pen involved, marker pen canceling key 90 available to cancel the registration of the marker pen registered, and register acknowledge key 92 for designating the "acknowledged" state when the color of the registered marker pen is acknowledged. LEDs 94, 96 and 98 for acknowledging corresponding key operations are provided near the keys 88, 90 and 92, respectively. A marker pen color display LCD 100 is provided on the control panel 70, displaying a marker color to be registered at the time of acknowledging the registration of the marker pen or a marker color to be canceled at the time of canceling the registration of the marker pen.

Figure 3:
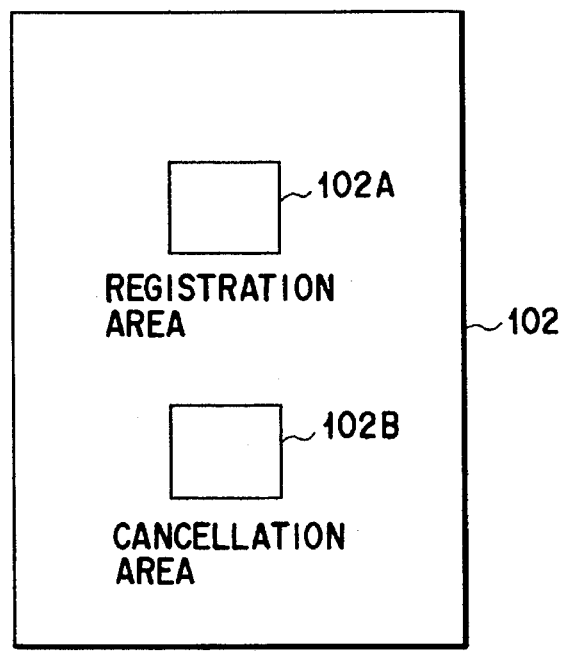
FIG. 3 is a plan view showing a sheet form used for marker pen registration and cancellation on the image forming apparatus shown in FIG. 1.

FIG. 3 shows a sheet form 102 usable at the time of registering the maker pen or at the time of canceling the registration of the marker pen involved. As will be set out in more detail below, upon registration by the marker pen, a registration area 102A on the sheet form is fully painted with a marker pen used and placed on the document glass 9 when this is done, the registration area 102A on the sheet is read out by the scanner 1 and the color of the marker pen is registered. Upon cancellation by the marker pen of the registration once made, a cancellation area 102B on the sheet form is fully painted with the marker pen and placed on the document glass 9. In this case, the cancellation area 102B on the sheet form is read out with the scanner 1, canceling the color registered by the marker pen.

FIG. 4 is a diagrammatical view showing a whole control system in the apparatus shown in FIG. 1. The control system includes a main controller, that is, a CPU 111, for generating control instructions which control respective parts of the apparatus as shown in FIG. 4. To the main controller 111 are connected the control panel 70, ADF (auto document feeder) drive unit, not shown, for driving associated rollers in RADF3, sensors (not shown) for detecting an operative state of each part in the copying apparatus, a sub-controller 114 for controlling the operation of the respective parts in the copying apparatus, and image processing unit 14.

The image processing unit 14 process analog image data corresponding to an image density from a color CCD sensor 7. The image processing unit 14 comprises an A/D conversion section, not shown, for converting an analog image signal to a digital image signal, shading correction section 116 for correcting the sensitivity of the CCD sensor 7 and nonuniformity in distribution of a light source's luminance, color processing section 118 for processing R, G and B color signals of the three primary colors from the CCD sensor 7 to find their ratio and for converting them to Y, M and C color signals, a filtering section 120 for eliminating noise components in the image signals and enhancing the edge of the image, trimming/masking section 122 for processing the image and subjecting it to trimming processing or masking processing, gradation processing section 124 for adjusting the gradation of the image signal processed and clarifying the image and laser drive section 126 for generating a semiconductor laser drive signal in accordance with the image signal. A marker color detecting section 128 for detecting a marker color and marker registrating/canceling section 130 for registering the marker color detected or canceling the registration of the marker color registered are provided between the filtering section 120 and trimming/ masking section 122 in the image processing unit 14.

When the start key 76 on the control panel 70 is depressed, the CCD sensor 7 in the image processing unit 14 sequentially generates R, G and B image signals corresponding to one line in synchronization with a scanning signal supplied from the sub-controller 114. The analog R, G and B image data are converted to digital image data, the output of the digital image data being supplied to the shading correcting section 116 where the shading is corrected. That is, the shading correcting section 116 corrects a variation in the CCD sensor's sensitivity which is included in the digital image data. The corrected image data are converted to the Y, M and C image signals after the computation of a ratio of R, G and B color image signals supplied to the color processing section 118. The converted Y, M and C image signals are subjected by the filtering section 120 to filtering processing so that noises are eliminated.

Figure 5:
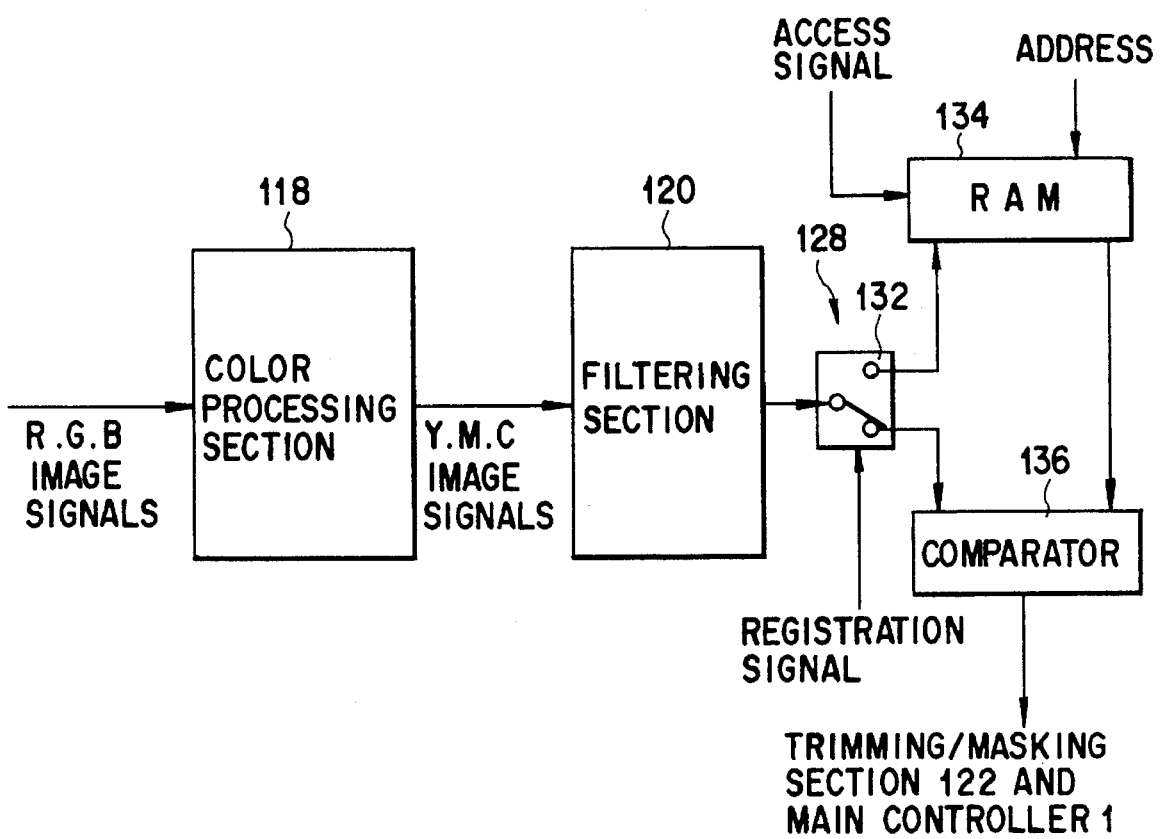
FIG. 5 is a block diagram showing, in more detail, a marker color detecting section and marker registering/canceling section in FIG. 4.

In the registration mode to which the marker pen registering key on the control panel 70 is depressed, corresponding Y, M and C image signals are supplied to the registering marker color detection section 128 and the corresponding color of the marker pen is registered on the marker registering/canceling section 130. As shown in FIG. 5, the marker registering/canceling section 130 comprises a RAM 134 and comparator 136 and the marker color detecting section 128 is comprised of a switching element 132. When the marker pen registering key 88 is depressed and scanning is performed on the registration area 102A of the sheet form 102, a registration signal is generated from CPU (main controller 111) and the switching element 132 is switched in response to the registration signal, enabling RAM 134 to be connected to the filtering section 120. Since the marker pen registering area 102A on the sheet form set out above is formed on the coordinates system at a predetermined area, CPU (main controller 111) can recognize the timing at which the area above is scanned and recognize the timing at which the CCD sensor 7 reads out the marker color. That is, CPU (main controller 111) generates a registration signal at the timing at which the marker color is read out, enabling the filtering section 120 to be connected to RAM 134 through the switching element 132. CPU (main controller 111) generates the registration signal and address signal. Using the address, color signals corresponding to the marker color are stored in RAM 134 at a predetermined area.

In the registration mode, when the color signals are registered in RAM 134, the filtering section 120 is connected through the switching element 132 to the comparator 136, supplying various color signals corresponding to various marker colors already registered in RAM 134 to the comparator 136 from RAM 134. The comparator 136 compares "registered" marker color signals supplied from the filtering section 120 to the "registered" marker color signals supplied from RAM 134 to see whether a coincidence or near-coincidence occurs between both. In the case of the near-coincidence or coincidence, a coincidence signal is supplied to CPU of the main controller 111. In response to the coincidence signal, CPU enables the corresponding near-coincidence color or coincidence color to be displayed on the marker pen color display LCD 100. When a clear stop key of the copying sheet number setting keys is depressed in the case where the coincidence color is displayed, a most recent color signal in RAM 134 is deleted. When the near-coincidence color is displayed and registration is made in that state, the registering key 88 is again depressed, completing the storing of color signals in RAM 134. The registration mode is completed in such a storing operation. During the registration mode the registration mode LED 94 continued ON.

In the case where the registration acknowledge mode is performed through the depression of the registration acknowledge key 92, an address signal corresponding to the registration area is supplied from CPU of the main controller 111 to RAM 134 and the registered color signals are read out and supplied to CPU of the main controller 111. CPU processes the color signals and operates the marker pen color LCD 100 to enable the color corresponding to the registered color signals to be displayed on the marker pen display LCD 100. When the registration acknowledge key 92 is again depressed, the registration acknowledge mode is completed and the marker pen color display LCD ceases its display.

When the registration of the marker pen is to be canceled, either of the first and second registration canceling routines is implemented, the first registration canceling routine canceling the marker color registration in accordance with the display of the marker pen color display LCD 100 and the second registration canceling routine canceling the registration of a marker color through the designation of a to-be-canceled marker color on the marker pen cancellation area 102B of the sheet form. In the first registration canceling routine, the marker pen registration acknowledge key 92 is depressed, a registration acknowledge signal is generated from CPU of the main controller 111 and access is gained to a predetermined address of RAM 134. Consequently, the registered color signal is sent from RAM 134 to the marker pen color display LCD 100 where it is displayed. In the case where the other marker colors are registered in RAM 134, the marker pen registration acknowledge key 92 is again depressed and the corresponding marker color is displayed on the marker pen color display LCD 100. The other marker colors are sequentially displayed on the marker pen color display LCD 100 by repeating the same operations as set out above. When the marker pen cancellation key 90 is depressed at a point of time a registered marker color to be canceled is displayed, then a corresponding registration cancellation signal is generated from CPU of the main controller 111 and the marker pen registration canceling LED 96 is flashed on and off. An instruction for deleting a storage portion in RAM 134 designated by a read address at the registration acknowledge time is supplied as an access signal to RAM 134, thus deleting the address-designated registration color in RAM 134. With the registration color thus deleted, the marker pen color display LCD 100 ceases its display and the marker pen registration canceling LED 96 is turned off, thus bringing a series of the registration cancellation steps to an end.

In the second registration cancellation routine, a marker color corresponding to a to-be-canceled marker color is painted with an already registered marker. In the case where the registration canceling mode is designated through the depression of the marker pen canceling key 90, a registration cancellation signal is generated from CPU of the main controller 111 and the marker pen registration cancellation LED 96 is flashed on and off while, on the other hand, the corresponding marker color of the sheet form is read into the apparatus in the same manner as at the time of registration. In accordance with the registration cancellation, the filtering section 120 is connected through the switching element 132 to the comparator 136 and various marker signals corresponding to those marker colors registered in RAM 134 are supplied from RAM 134 to the comparator 136 where comparison is made between the marker color signal supplied from the filtering section 120 and the registered marker color signal supplied from RAM 134. When a coincidence occurs between the two, a coincidence signal is supplied to CPU of the main controller 111. Upon response to the coincidence signal a delete instruction is supplied as an access signal to RAM 134 so as to delete the corresponding storage portion in RAM 134 which is designated by the address read out when that coincidence signal is generated. In this way, the registered color designated by the address above is deleted from the corresponding storage portion of RAM 134. When the registration color is detected, a corresponding display disappears on the marker pen color display LCD 100 and the marker pen registration cancellation LED 96 is turned off. In this way, this routine is ended as a sequence of registration canceling steps. Since, as in the same manner as the registration mode, the marker pen cancellation area 102B of the sheet form is defined at a predetermined area of a coordinates system, CPU of the main controller 111 recognizes this area at a timing in which scanning is made. It is, therefore, possible for CPU to recognize that, in accordance with the designation of the cancellation mode, the CCD sensor reads out the marker color. Thus the corresponding registration signal is generated. Similarly, during the cancellation mode the cancellation mode LED 96 continues ON.

When the marker pen editing key 68 and masking key 80 or trimming key 82 are depressed so that an edit mode is designated, the filtering section 120 is connected through the switching element 132 to the comparator 136. In the edit mode, an address signal corresponding to the registered marker pen color is supplied from the main controller to RAM 134 and the designated color signal is supplied to the comparator 136 where comparison is made between the image signal supplied from the filtering section 120 and the registered marker color signal. When a coincidence occurs between the two, a coincidence signal is supplied to the trimming/masking section 122 where, in accordance with the coincidence signal, subsequently supplied image signals are subjected to editing processing during comparison. In the trimming mode for a one-line image signal, the image signal is inhibited from passing the trimming/masking section 122 until a first coincidence signal is delivered. During the time period from the generation of the coincidence signal to the generation of the next coincidence signal, the image signal is allowed to pass the trimming/masking section 122 and, when another coincidence signal is generated, a corresponding image signal is inhibited from passing the trimming/masking section 122. In the masking mode for a one-line image signal, until a first coincidence signal is delivered, the image signal is allowed to pass the trimming/masking section 122. During the time period from the generation of the coincidence signal to the generation of the next coincidence signal, the image signal is inhibited from passing the trimming/masking section 122. When another coincidence signal occurs, the image signal is allowed to pass the trimming/masking section 122.

The image signal, having passed the trimming/masking section, is supplied to the gradation processing section 124 where its gradation level is adjusted. The resultant image is supplied to the laser drive section 126. In response to the image signal supplied, the laser drive section 126 generates a drive signal, enabling the semiconductor laser to be driven. As a result, an image being left as a not-edited one is formed on the surface of the photosensitive drum 29 for a normal mode and an edited image is formed there for the edit mode.

Figure 6:
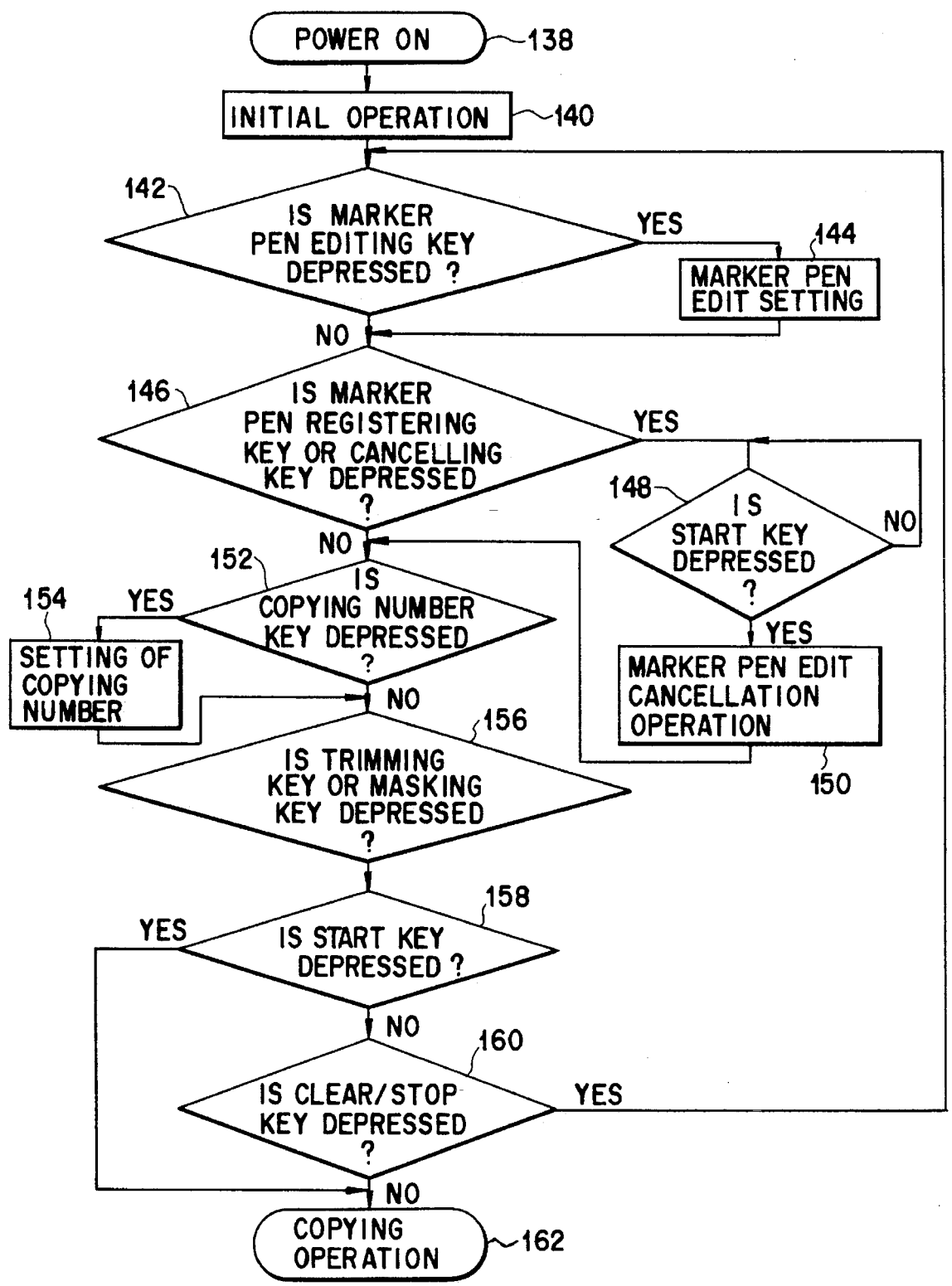
FIG. 6 is a flow chart showing an operation of the image forming apparatus in FIG. 4.

The operation of CPU of the main controller 111 will be explained below with reference to FIG. 6.

With a power source of the apparatus ON as shown at step 138, an initial operation is started as shown at step 140 and a confirmation is made, as shown at step 142, on whether or not the marker pen editing key 68 is depressed. If the edit button 68 is depressed as shown at step 144, an edit mode using a marker pen is set to the apparatus. If the edit mode is designated, an desired area of a document on the document glass 9, that is, a document area bounded by the marker pen, is read into the apparatus.

If the edit mode is not set, confirmation is made, as shown at step 146, on whether the marker pen registrating key 88 or canceling key 90 is depressed. If the marker pen registering key 88 or canceling key 90 is depressed, then the registration mode or cancellation mode is set. When the registration mode or cancellation mode is set as already explained above, the marked sheet form for registration/cancellation is set on the document glass when, at this time, the start key 76 is depressed as shown at step 148, then the marker pen registration/cancellation operation is performed as shown at step 150.

When the marker pen registration mode or cancellation mode is not set, confirmation is made, by the copying sheet number setting key 72, on whether or not the number of copying sheets is entered (see step 152). If the number of copying sheets is entered, that number is set to the apparatus and displayed on the display section 74. When the setting of the copying sheet number is completed, confirmation is made, as shown at step 156, on whether the trimming key 88 or masking key 90 is depressed. With the start key 76 depressed as shown at step 158, a copying operation is started as shown at step 162. If the start key 76 is not depressed as shown at step 158 and clear stop key C/S is depressed, then control goes back to step 142, invalidating the setting operation already made thus far.

Figure 7:
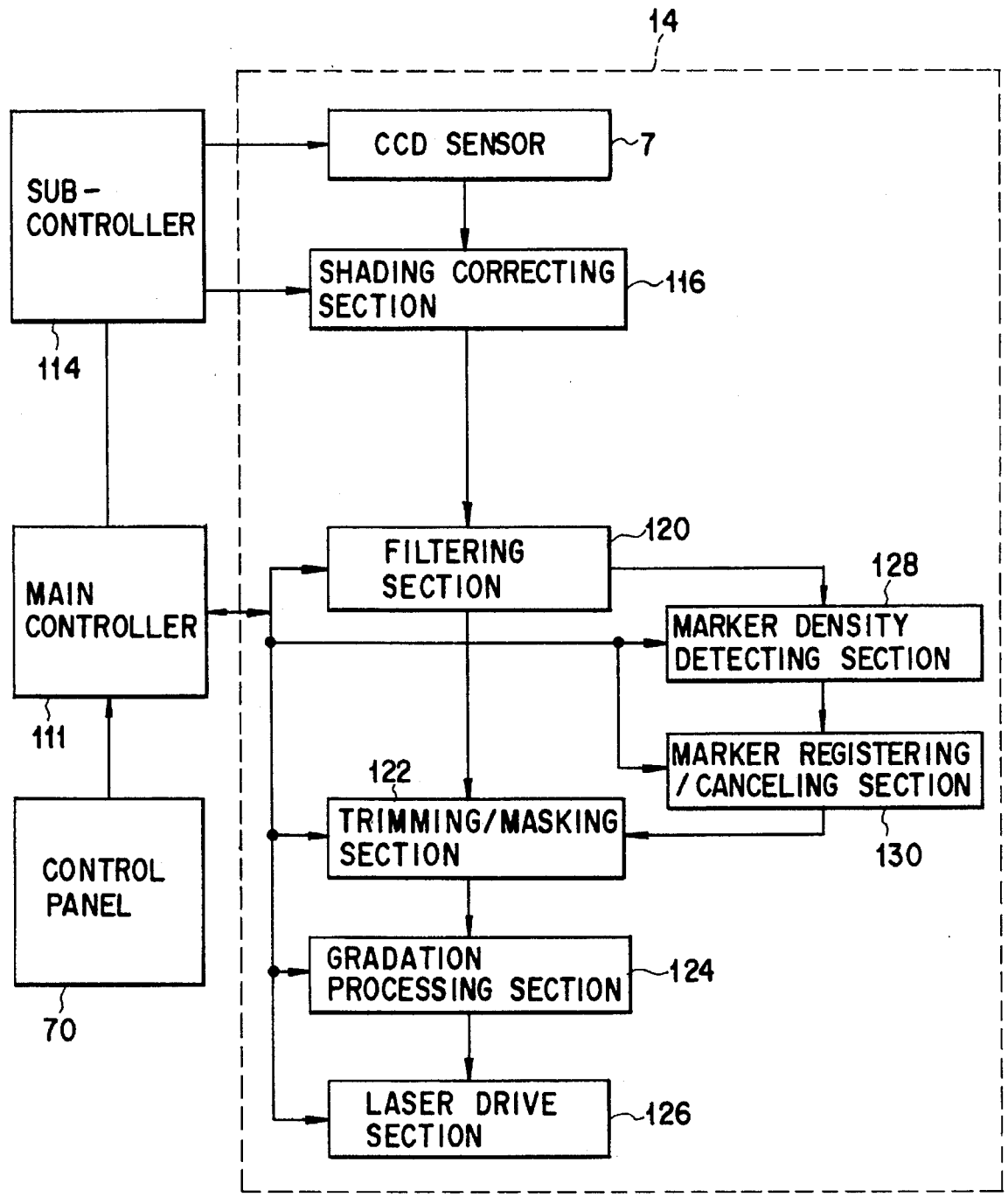
FIG. 7 is a block diagram showing an image processing circuit for the image forming apparatus according to another embodiment of the present invention.

In the above-mentioned embodiment, the editing area is designated by the marker color in the case of the editing mode and, irrespective of whether the monochrome or color image is formed on the document, the CCD sensor 7 is used as a means for detecting the marker color. The present invention is not restricted to the above-mentioned embodiment. In place of the marker color, a marker may be employed by which the editing area can be designated using an image density or both the image density and specific line width. FIG. 7 shows an embodiment, according to which such image density and specific line width are used as a marker for designating the editing area.

In the circuit shown in FIG. 7, a monochrome CCD sensor is used as the CCD sensor 7 and such a color processing circuit as referred to as the color processing circuit 118 in FIG. 4 is omitted from the circuit of FIG. 7. When the start key 76 on the control panel 70 is depressed in an image processing section 14 shown in FIG. 7, image signals can be sequentially generated from a CCD sensor 7 in synchronization with a scanning signal supplied from a sub-controller 114 in which case each image signal has a density signal corresponding to one image line. The corresponding image data having such an analog density signal is converted to digital image data and the corresponding output is supplied to a shading correcting section 116 where a corresponding shading is corrected. That is, the shading correcting section 116 corrects a variation in sensitivity of the CCD sensor 7 which is included in the digital image data. The corrected image data is subjected, by a filtering section 120, to filtering processing so that noise is eliminated.

Before setting a registration mode or canceling the registration of a marker pen, a marker line having a predetermined width peculiar to the marker pen is drawn in a registration area 102A on the sheet form 102 shown in FIG. 3 and the sheet is placed on the document glass.

In the registration mode to which the marker pen registering key 88 is depressed on a control panel 70, an image signal having a density signal, which corresponds to one image line of the marker line, is sent to a registration marker density detecting section 128 and the corresponding density and line width of the marker pen are registered to a marker registering/canceling section 130. As shown in FIG. 8, the marker image density registering/canceling section 130 comprises a RAM 134 and comparator 136 and the marker density detecting section 128 is comprised of a switching element 132. When the marker pen registering key 88 is depressed and scanning is made over the registration area 102A of the sheet form 1, a registration signal is generated from a CPU of a main controller 111. In response to the registration signal, switching is made at a switching element 132 so that RAM 134 is connected to a filtering section 120. That is, CPU of the main controller 111 generates a registration signal at a timing in which the marker density is read out. This enables the filtering section 120 to be connected to RAM 134 through the switching element 132. CPU generates, together the registration signal, an address signal. Using the address, a marker density and density-continuous pixel number, that is, line width of the marker, are stored in RAM 134 at a predetermined area.

In the registration mode, when the marker density and line width are registered in RAM 134, switching is made at the switching element 132 to connect the filtering section 120 to the comparator 136 through the switching element 132. On the other hand, a density signal corresponding to each of various marker densities already registered in RAM 134 is supplied from RAM 134 to the comparator 136. Comparison is made between a density level at the density signal from the filtering section 120 and the density level of the density signal stored in RAM 134 and also between the pixel number of a registering marker density signal, which corresponds to line width, supplied from the filtering section 120 and the pixel number of the marker density signal, which corresponds to, line width stored in RAM 134. Confirmation is made on whether a coincidence or near-coincidence occurs. In the case of a near-coincidence or coincidence, a corresponding coincidence signal is supplied to CPU of the main controller 111. In accordance with the coincidence signal, CPU enables a marker pen density display LCD 100 to display a corresponding near-coincidence density or coincidence density and line width. When a clear stop key of the copying sheet number keys is depressed in the case where the near-coincidence density and coincidence density are displayed, a most recently stored density signal is deleted from RAM 134. In the case where the near-coincidence density is displayed and registered as it is, the registering key is again depressed, completing the storing of the corresponding density signal and line width into RAM 134. This completes the registration mode. During the registration mode, the registration mode LED 94 is continued ON.

When, in the edit mode, the marker pen editing key 68 is depressed and masking key 80 or trimming key 82 is depressed, the filtering section 120 is connected through the switching element 132 to the comparator 136. Further, an address signal corresponding to an image density of the marker pen registered at the edit mode is supplied from the main control unit to RAM 134 and a designated density signal is supplied to the comparator 136. At the comparator 136, comparison is made between the image signal supplied from the filtering section 120 and the marker density signal registered. If a coincidence occurs between their image densities and between the line widths coincide within a predetermined tolerance error range, a resultant coincidence signal is supplied to the trimming/masking section 122. Here, as already set out above, the pixel number of the coincidence density corresponds to the line width of the marker and the tolerance error is set based on a reference with which the line width is in a range of, for example, over 2 mm to below 5 mm or over 3 mm. During comparison made in accordance with the coincidence signal, the trimming/masking section 122 subjects those sequentially supplied image signals to editing proceeding. In the trimming mode, until a first coincidence signal is issued in the case of a one-line image signal, the image signal is inhibited from passing the trimming/masking section 122 and, during the time period of the generation of one coincidence signal to the generation of the next coincidence signal, the image signal is allowed to pass the trimming/masking section 122. When a coincidence signal again emerges, the image signal is inhibited from passing the trimming/masking section 122. In a masking mode, until a first coincidence signal is issued in the case of the one-line image signal, the image signal is allowed to pass the trimming/masking section 122 and, during the time period of the generation of one coincidence signal to the generation of the next coincidence signal, the image signal is inhibited from passing the trimming/masking section 122. When a coincidence signal is again generated, the image signal is allowed to pass the trimming/masking section 122.

The implementing of the registration acknowledge mode through the depression of the registration acknowledge key 92 and that of the registration cancellation mode for canceling the registration of the marker pen are the same as already set out in connection with the preceding embodiment and, therefore, any explanation on this matter is omitted.

According to the present invention, as set out above, the general-purpose marker pen can be registered as the editing marker pen on the image forming apparatus, without designating any editing range by a corresponding specific marker pen, and the editing operation can be performed using the registered marker pen.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for forming an edited image from an image which is read from a document, the edited image being defined with respect to an editing range designated on the document, the editing range being designated by a registered marker pen, comprising:

means for setting a registration mode in which a mark of a new marker pen different from a previously registered marker pen is registered and an editing mode in which the editing range on the document is designated with the new marker pen;

means for storing a previously registered marker pen signal corresponding to the previously registered marker pen;

first converting means for converting the mark of the new marker pen to a new marker pen signal;

means for storing one of the new marker pen signal and the previously registered marker pen signal;

second converting means for converting the image read from the document and the editing range designated on the document into an image signal;

means for comparing one of the new marker pen signal and the registered marker pen signal with the image signal to edit the image signal; and image forming means for forming the edited image on a basis of the image signal edited by the comparing means.

2. The image forming apparatus according to claim 1, in which the second converting means includes means for reading the image on the document at a specific area in the edit mode.

3. The image forming apparatus according to claim 1, in which the first converting means includes means for reading a color of the mark of the new marker pen, marked on the document at a specific area in the registration mode.

4. The image forming apparatus according to claim 1, in which the first converting means includes means for reading an image density of the mark of the new marker pen, marked on the document at a specific area in the registration mode.

* * * * *